Feb. 9, 1960   J. R. ABBOTT   2,924,116
PARKING BRAKE
Filed Nov. 14, 1955   2 Sheets-Sheet 1

INVENTOR.
JAMES ABBOTT.
BY
John A. Young
ATTORNEY.

Feb. 9, 1960  J. R. ABBOTT  2,924,116
PARKING BRAKE

Filed Nov. 14, 1955  2 Sheets-Sheet 2

INVENTOR.
JAMES ABBOTT.
BY John A. Young
ATTORNEY.

United States Patent Office 2,924,116
Patented Feb. 9, 1960

2,924,116

PARKING BRAKE

James R. Abbott, Columbus, Ohio, assignor to Bendix Aviation Corporation, South Bend, Ind., a corporation of Delaware Application November 14, 1955, Serial No. 546,553

8 Claims. (Cl. 74—519)

This invention relates generally to parking brake and more specifically to the construction of a parking brake lever which is mechanically actuated to apply a pair of brake shoes.

It is an object of the invention to provide a lever which better lends itself to manufacture by stamping methods with the result that fewer of the levers must be discarded or rejected. Another object of the invention is to provide a parking brake lever which facilitates assembly of the parking brake and reduces the possibility of misassembling the parking brake.

Other objects and features of the invention will become apparent from a consideration of the following description taken in connection with the accompanying drawings, wherein.

Figure 1:
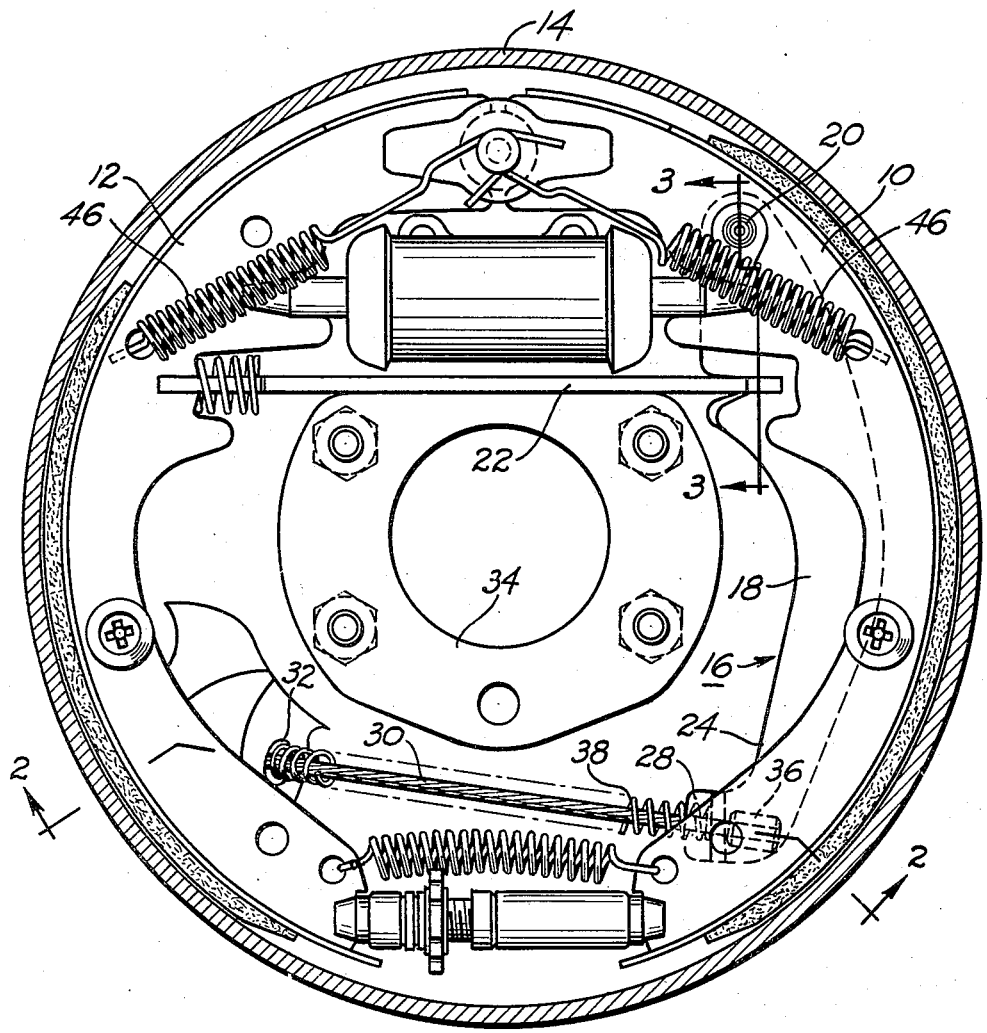
Figure 1 is a plan view of a brake having the invention installed therein.

As shown in Figure 1, arcuate brake shoes 10 and 12 are pivoted into frictional engament with a rotatable drum 14 by either mechanical or hydraulic actuation. This invention is primarily concerned with mechanically applying the shoes to obtain "parking" braking.

Figure 2:
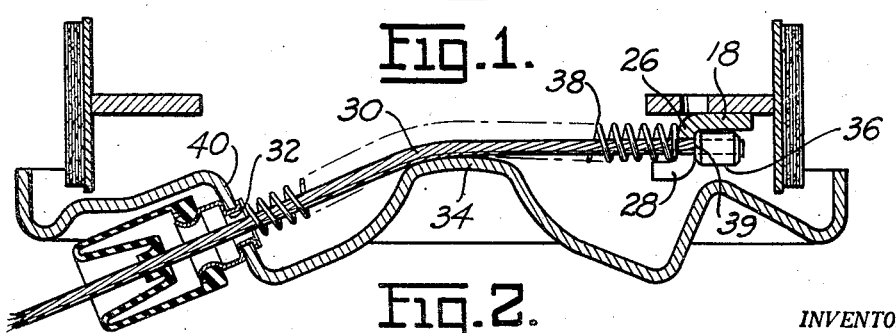
Figure 2 is a section view taken on line 2—2 of Figure 1.

The parking brake in Figure 1 is indicated generally by reference numeral 16. The parking brake consists of a lever 18 which is pivoted to brake shoe 10 by means of a pivot 20. A strut 22 is secured at one end to the parking brake lever 18, and bear at the other end against shoe 12. At the applying end 24 of the lever and along the side thereof, there is formed an integral depending flange 26. The end of the flange 26 is turned back to provide a ledge 28. To rotate the lever there is provided a cable 30 which passes through an opening 32 in support plate 34. A boss 36 is secured to the end of cable 30 and a spring 38 surrounds cable 30 and is compressed longitudinally between shoulder 40 (Figure 2) and one side of flange 26.

Figure 5:
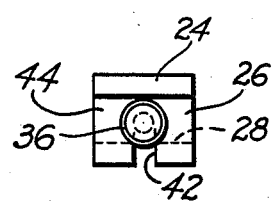
Figure 5 is an end view of Figure 4 looking in the direction indicated by the arrows 5—5 in Figure 4.

As best seen in Figure 5, the ledge 28 and flange 26 have a slot 42 formed therein to admit cable 30.

Figures 4, 6:
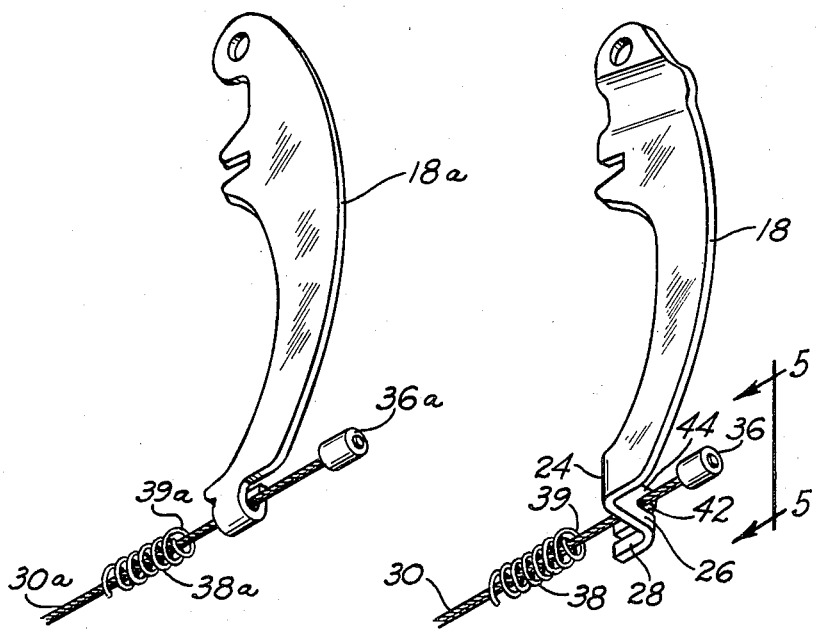
Figure 4 is an isometric view of the brake lever shown in Figure 1.
Figure 6 is an isometric view of the previously used parking brake lever.
Figure 3:
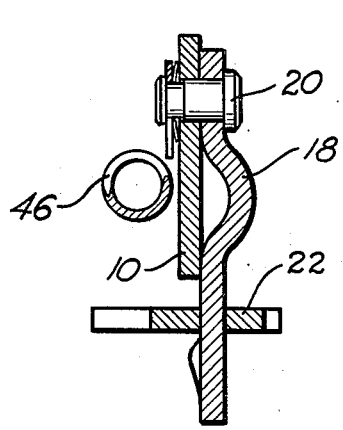
Figure 3 is a section view taken on line 3—3 of Figure 1.

The cable 30 is secured to the applying end 24 of the lever in the following manner: The spring 38 is longitudinally compressed so that there is sufficient portion of cable between the end 39 of the spring 38 and the boss 36 which can be passed along the slot 42 until boss 36 is lodged in the corner between flange 26 and the underside of the lever end 24. The spring is then allowed to return so that it bears against the opposite side of flange 26 and is supported by the ledge 28 (Figure 4). The spring 38 produces tension in the cable 38 so that the boss 36 is pulled against the flange 26 and lodges against the underside of the lever 24 and side 44 of flange 26. The boss 36 is prevented from moving in a downward direction by the spring force urging it against side 44. Also, the boss 36 is held upwardly by the ledge 28 since there is only a slight clearance between the end 39 of the spring and boss 36. The short cable length between the end of the spring and the boss prevents sagging of the boss.

When the operator is securing the cable 30 to the applying end 24 of the lever 18, the boss 36 is not visible to him. It, therefore, presents a problem how to insure proper positioning without benefit of visual inspection.

This invention provides a method for positively obtaining proper location of the boss 36 and retaining it in this location throughout the useful life of the brake. When the end 39 of the spring 38 is positioned on the ledge 28, the boss 36 is brought to the proper vertical location since the boss 36 is supported by the ledge 28 through the spring 38.

In previous installations, such as the one shown in Figure 6, there was considerable clearance between the end of the spring and the boss 36. The cable length which extended through this distance permitted a certain amount of flexible movement of the boss 36 which frequently resulted in mislocation of the boss 36. Because the attachment of the cable was through a "blind" process with these previous devices, the installer could not be sure whether the boss was properly located or not. With the present invention, however, this uncertainty is eliminated because the shortened clearance between the end of the spring and the boss insures horizontal alignment of the boss 36 with the end of the spring with the result that the boss position may always be exactly determined.

The parking brake is operated by pulling on the cable 30 through a handle or pedal which is accessible to the operator. The cable is drawn through the opening 40 and the lever is pivoted in a clockwise direction (Figure 1), thus applying the brake shoes 10 and 12. As the lever 18 is turned to apply the shoes, the spring 38 is compressed between shoulder 40 and flange 26 so that when the parking brake is released, the spring 38 returns the lever to its original position, thus permitting the return springs 46 to retract the brake shoes.

From a consideration of the construction of the parking lever, it will be seen that only two right angle bends are required to fabricate the parking brake lever. I have found that it is advantageous to manufacture this lever by a stamping operation since it is possible by a single punch of the die to obtain the desired configuration of the lever. The two spaced right angle bends composing the flange 26 and ledge 28 do not impose prohibitive stresses on the material to cause cracking or breaking during the manufacturing process. With the parking brake lever shown in Figure 6, however, it was necessary to carry out the stamping process in two stages to obtain a single 180 degree bend. This was a costly operation and was often accompanied by breaking, cracking, and weakening of the lever owing to internal stresses which were imposed upon the material. It will thus be seen that the present invention is an improvement over prior braking levers, not only in operation but also in manufacture.

Although the invention has been described in connection with a single example embodiment, it will be apparent to those skilled in the art that the principles of the invention are susceptible of numerous applications with devices other than the specific selected embodiment. It is my intention to include within the scope of the following claims these additional devices which may incorporate the principles disclosed herein.

I claim:

1. A parking brake comprising a lever pivoted at one end thereof, a depending segment at the other end of said lever, a ledge formed by turning back said depending segment to thereby provide an S-shaped cross section perpendicular to the longitudinal axis of said lever, said ledge and depending segment being slotted to permit attachment of an actuating means, said actuating means including a flexible cable, an elongated helical spring through which said cable is passed, and a boss secured to the end of said cable, said cable being passed through the slotted portion of said ledge and depending segment so that said boss is lodged against the underside of the lever and bears against one side of said depending segment, said spring being supported on said ledge and bearing against a side of said depending segment so that the end of the spring and boss are separated by the thickness of said depending segment.

2. A parking brake construction comprising a lever having an input end, a flange formed transversely to the input end of said lever and along the side thereof, a ledge which is formed by turning back the end of said flange, an applying cable with a boss at the end thereof, a spring surrounding said cable and supported at one end thereof on said ledge and bearing against one side of said flange, said flange being slotted to admit said cable and permit the boss to lodge between the underside of the lever and the side of said flange opposite said spring.

3. A parking brake system including a turnable lever, a transverse flange formed along a side of said lever at the "force" input end thereof, a turned back end of said flange which forms a ledge, an applying cable, said flange and ledge being slotted so that said applying cable may be slipped across the face of said flange, spring means encompassing said cable and resting on said ledge to maintain the position of said cable in said slot, said spring means bearing against a side of said flange, and a boss on the end of said cable which is lodged between the underside of said lever and the contiguous side of said flange.

4. In the process of attaching an applying cable to a lever member, the steps of: threading the cable through a helical spring and securing a boss to the end of said cable, compressing the spring to provide a length of unsurrounded cable between the helical spring and boss secured at the end of the cable, sliding the unsurrounded cable portion through a slot in a depending segment of the actuatable end of the lever so that the boss is brought toward the undersurface of the lever, and then releasing the spring so that the spring end will be positioned on a ledge formed at the end of said actuating lever to thereby draw the boss at the end of the cable against the undersurface of the lever and the depending segment of said lever whereby the operative position of the cable is determined, the end of said spring being held by the ledge to maintain the cable end in its proper location.

5. A method for securing a spring surrounded cable to a parking brake lever comprising the steps of: bending downwardly and backwardly the terminal portion of a parking brake lever, slitting said terminal portion, compressing the flexible spring surrounding the end of the cable which is to be attached to the lever, said cable end having a boss affixed thereto, slipping the uncovered portion of the cable within the slitted, stepped terminal portion of the lever so that the boss is brought against the undersurface of the lever and the depending portion thereof, and releasing said spring so that it bears against the side of the depending portion opposite that engaged by the boss, said spring being held in place by the turned back ledge which thereby holds the boss lodged against the lever undersurface and depending portion which thereby serves as an attachment between the cable and the lever terminal.

6. The steps of attaching a flexible operating cable to the actuating lever of a parking brake assembly, comprising the steps of: forming a lever at the actuatable end thereof with a depending portion with the end thereof turned back to form a stepped construction having a slot formed therein, string a cable from an operator-accessible lever to the actuatable end of the actuating lever, threading a length of cable first through a fixed member and then a coiled spring which is greater in its relaxed length than the cable portion extending from the fixed portion to the actuating lever end, providing an enlarged boss which is fixedly secured at the cable end to be attached to the operating lever, pressing said coil spring to uncover a cable segment which is inserted within the slotted end of the lever in such a manner that the boss is lodged between the lever and bent portion thereof, and relaxing said spring so that the spring end rests on the ledge portion and bears against the bent portion at the opposite side of said boss so that the boss is held in attched relation with the lever end to serve as a connection between the cable and applying lever.

7. An actuator for a parking brake comprising a pivoted lever, a depending flange formed at the actuatable end of said lever, said depending flange having a turned back ledge, the ledge and flange being slotted between the sides thereof, an actuating cable which is fitted into said slotted portion, a resilient helical spring surrounding the cable and compressed between a fixed abutment at one end and the depending flange at the other end, and a boss which is located at one end of the cable and is fitted against the undersurface of the lever, the end of the spring bearing against the ledge serving to locate the boss which is held in operative place by being lodged against the undersurface of the lever and depending flange, and maintained in this position by the supportive engagement of the spring end with said ledge.

8. A parking brake construction comprising an applying lever, a slotted first flange formed at one end of said lever and transversely thereto to define a corner between the sides of said lever and flange, a slotted second flange extending transversely to said first flange and defining a corner between a side of said second flange and the side of said first flange opposite to that defining said first mentioned corner, an elongated force transmitting member received in the slots of said flanges, a boss located at one end of said cable and received in said first mentioned corner, and spring means encompassing a portion of said force transmitting member adjacent said boss and received in said second mentioned corner.

References Cited in the file of this patent

UNITED STATES PATENTS

| 173,389 | Clayton | Feb. 15, 1876 |
| 1,391,457 | Buckley et al. | Sept. 20, 1921 |
| 1,944,531 | Schweiss | Jan. 23, 1934 |
| 2,374,526 | Coe | Apr. 24, 1945 |
| 2,666,504 | Berno et al. | Jan. 19, 1954 |
| 2,667,081 | Asp et al. | Jan. 26, 1954 |

FOREIGN PATENTS

| 787,804 | France | July 16, 1935 |